Feb. 15, 1955 J. C. SPINDLER 2,702,347

BROAD-BAND ANTENNA

Filed Jan. 27, 1954

JOSEPH C. SPINDLER

*INVENTOR.*

BY Francis W. Crotty

HIS ATTORNEY.

2,702,347

BROAD-BAND ANTENNA

Joseph C. Spindler, Chicago, Ill., assignor to Zenith Radio Corporation, a corporation of Illinois Application January 27, 1954, Serial No. 406,510

6 Claims. (Cl. 250—33.59)

This invention relates to a broad-band antenna operable over three frequency ranges spaced from one another in the frequency spectrum. Under the authority of the Federal Communications Commission, those portions of the frequency spectrum which are currently assigned to television broadcast service lie in the ranges from 54 to 88 mcs., from 174 to 216 mcs., and from 470 to 890 mcs. In many localities, concurrent television broadcasting on channels in all three frequency ranges is authorized or contemplated, and television receivers must therefore be equipped to operate at all frequencies in any of the ranges. Satisfactory operation in this manner may of course be achieved by providing each receiver with three separate antenna installations designed respectively for reception in the three frequency bands utilized for television transmission. Such installations, however, are obviously both cumbersome and costly.

It is an object of this invention, therefore, to provide a new and improved antenna which operates efficiently over three separate frequency ranges in the frequency spectrum.

It is a further object of the invention to provide a novel broad-band antenna which functions efficiently over each of the three frequency ranges currently allocated to commercial television broadcasting.

In those instances where the size of an antenna is limited by available space considerations, it may be possible to utilize an antenna which permits adjustment of the length of the individual radiating or receiving elements. Alternatively, it may be possible to effect adjustment by tuning means, other than variable-length radiating or receiving elements. Either of these expedients may require an antenna adjustment whenever the receiver is tuned from one frequency or channel to another, and this may not only be annoying to the consumer but may result in inferior image reproduction from time to time as a result of inaccurate antenna tuning.

It is therefore a further object of this invention to provide a new and improved fixed-tuned tri-range broad-band antenna.

There are various known types of indoor antennas which, within service areas centrally located with respect to a group of television stations, result in satisfactory reception with image reproduction comparable to that achieved through the use of more costly and complex outdoor antennas. Ideally, for obvious reasons, such antennas should be adapted for installation within the confines of the receiver cabinet. However, in most television receiver cabinets only a limited space is available and this alone imposes a severe design limitation. Moreover, any built-in antenna should be substantially omni-directional to avoid the necessity of physically orienting the entire receiver for optimum reception with each station selection.

Hence, it is another object of this invention to provide a broad-band tri-range antenna which is sufficiently compact to mount within the confines of a conventional television receiver cabinet.

It is still another object of this invention to provide a broad-band tri-range antenna which is substantially omni-directional at frequencies within the operating ranges.

In accordance with the invention a broad-band antenna operable over three frequency ranges spaced from one another in the frequency spectrum comprises four folded dipoles individually spaced from each adjacent dipole by a distance of approximately three-quarters wavelength at the geometric mean frequency of the highest one of the frequency ranges, and individually having an effective electrical length of substantially one-half wavelength and each such dipole having terminal portions. The antenna further comprises a first parallel-conductor transmission line interconnecting the terminal portions of two of the four dipoles, to form, in combination therewith a fifth folded dipole having an electrical length of substantially one-half wavelength at the geometric mean frequency of the intermediate one of the frequency ranges and having terminal portions. The antenna further includes a second parallel-conductor transmission line interconnecting the terminal portions of the remaining two of the first mentioned folded dipoles to form in combination therewith a sixth folded dipole also having an effective electrical length of substantially one-half wavelength at the geometric mean frequency of the intermediate one of the frequency ranges and being further provided with terminal portions. The terminal portions of the fifth folded dipole are spaced from the terminal portions of the sixth folded dipole by a distance of approximately one-half wavelength at the geometric mean frequency of the intermediate one of the frequency ranges. The antenna is also provided with an additional parallel-conductor transmission line which has feeder terminals in one of its conductors and interconnects one of the terminal portions of the fifth and sixth dipoles, thus forming an antenna element which has an effective electrical length approximately equal to one-half wavelength at the geometric mean frequency of the lowest of the frequency ranges.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
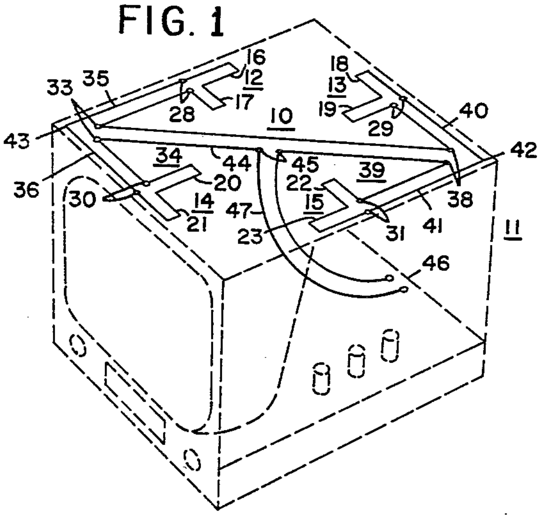
Figure 1 is a perspective view showing a television receiver cabinet in dotted outline having disposed therein an antenna structure constructed in accordance with the invention.

Figure 1 portrays a broad-band antenna 10 enclosed within the cabinet of a television receiver 11 and operable over three frequency ranges spaced from one another in the frequency spectrum. Antenna 10 is disposed in the plane of the top of the cabinet and comprises four folded dipoles 12, 13, 14 and 15. Each of the four dipoles includes a pair of legs 16 and 17, 18 and 19, 20 and 21, 22 and 23 of equal length, with the legs of each pair disposed at an angle of substantially 90° relative to one another.

The apices of dipoles 12, 13, 14 and 15 are individually spaced from each adjacent apex by a distance of approximately three-quarters wavelength at the geometric mean frequency of the highest one of the frequency ranges, and each leg of each such dipole has a length of substantially one-quarter of this wavelength to provide an effective electrical length of one-half wavelength for each dipole. The four dipoles have terminal portions designated 28, 29, 30 and 31 located in the vicinity of their respective apices. The terminal portions are designated by reference numerals as a convenience to assist in explaining the construction and operation of the antenna and may not be physically distinguishable in an actual embodiment of the invention.

A first parallel-conductor transmission line 35, 36 having terminal portions 33 centrally located in one of its conductors, is disposed in the plane of dipoles 12, 13, 14 and 15 and interconnects terminal portions 28 and 30 of dipoles 12 and 14. This line is a continuation of legs 16 and 21 of dipoles 12 and 14 and is formed to an angle of substantially 90° at its center to define, in combination with dipoles 12 and 14, a fifth folded dipole 34 having a pair of legs 35 and 36 of equal length disposed at an angle of 90° relative to one another. Leg 35 is the line section from terminal portion 33 through conductor section 16, while leg 36 is the line section from the same terminal portion through conductor 21. Each of legs 35 and 36 is constructed to have a length of substantially one-quarter wavelength at the geometric mean frequency of the intermediate one of the frequency ranges to provide an effective length of approximately one-half wavelength for dipole 34.

A second parallel-conductor transmission line 40, 41, having terminal portions 38 centrally located in one of its conductors interconnects terminal portions 29 and 31 of dipoles 13 and 15. This transmission line is a continuation of legs 18 and 23 of dipoles 13 and 15 and is formed at an angle of 90° at its center to define, in combination with dipoles 13 and 15, a sixth folded dipole 39 having a pair of legs 40 and 41 of equal length disposed at an angle of substantially 90° relative to one another. Leg 40 is the line section from terminal portion 38 through conductor section 18, while leg 41 is the line section from the same terminal portion through conductor 23. Each of legs 40 and 41 is constructed to have a length of substantially one-quarter wavelength at the geometric mean frequency of the intermediate one of the frequency ranges to provide an effective electrical length of approximately one-half wavelength for dipole 39. Dipoles 34 and 39 are disposed in a common plane inside the top of cabinet 11 and are preferably arranged at opposite corners of the cabinet top. Each leg 40, 41 and 35, 36 of dipoles 39 and 34 describes an equal angle with a cabinet-top diagonal connecting apex 42 of dipole 39 and apex 43 of dipole 34.

An additional parallel-conductor transmission line 44, having feeder terminals 45 in the central portion of one of its conductors, interconnects terminal portions 33 and 38 of dipoles 34 and 39. Transmission line 44 forms an antenna element having an effective electrical length approximately equal to one-half wavelength at the geometric mean frequency of the lowest one of the frequency ranges and lies along a line connecting the apices of dipoles 34 and 39.

Antenna 10 is coupled, by means of parallel-conductor feeder 47, to a signal-translating circuit 46, as for example the signal receiving and amplifying circuits of the television receiver enclosed within cabinet 11. Feeder 47 is preferably constructed of commercially available twin lead transmission line having a surge impedance approximately equal to the terminal impedance of antenna 10, to permit the use of a feeder of any desired length.

The individual conductor elements of antenna 10 and feeder 47 may be constructed of a parallel-wire line having a surge impedance of 300 ohms. In one suitable twin-lead transmission line which is commercially available, each conductor is composed of seven strands of No. 28 copper wire, the conductors being imbedded in a polyethylene insulation and spaced by a distance of a .3 inch. The overall width of the line, including insulation, is .4 inch and the thickness of the insulation at a point intermediate the conductors is .062 inch.

As an illustration, but in no sense a limitation, a working embodiment of the invention may be constructed by cutting at its center one of the conductors of a twenty-four inch piece of 300-ohm parallel-wire transmission line, thus forming transmission line 44 provided with center terminal portions 45. One of the conductors at either of the free ends of another length of 300-ohm parallel-conductor transmission line may then be soldered to one of the terminals 45 of transmission line 44 and the other conductor thereof may be attached to the remaining terminal 45 in like manner, thus forming feeder line 47 having one end free for attachment to the antenna terminals of a television receiver. Each of dipoles 34 and 39 may be constructed of a twenty-four inch length of 300-ohm parallel-conductor transmission line, having its ends soldered together to define a closed conductive loop. One of the conductors of the loop is severed at its center portion to provide terminals (terminals 33 of dipole 34 or terminals 38 of dipole 39). The conductive loop is deformed or bent to constitute the two leg sections disposed at an angle of substantially 90° with respect to each other. That conductor of each leg of the dipole which provides the terminals for connection with line section 44 is cut four inches from its closed end and a short stub, comprising a four-inch length of short-circuited 300-ohm parallel-conductor transmission line, is soldered in series relation in that conductor at that point. This stub line is physically disposed in the plane of each leg and is perpendicular thereto. Thus, dipoles 34 and 39 and dipoles 12, 13, 14 and 15 are concurrently formed and the construction of antenna 10 is completed by soldering the terminal portions of dipoles 34 and 39 to the appropriate ends of transmission line 44.

For convenience, the antenna of Figure 1 and all subsequently treated explanatory portrayals of the antenna will be explained as if utilized for radiating signals, inasmuch as the electrical characteristics of the antenna are the same for transmitting as for receiving signals.

Figure 2:
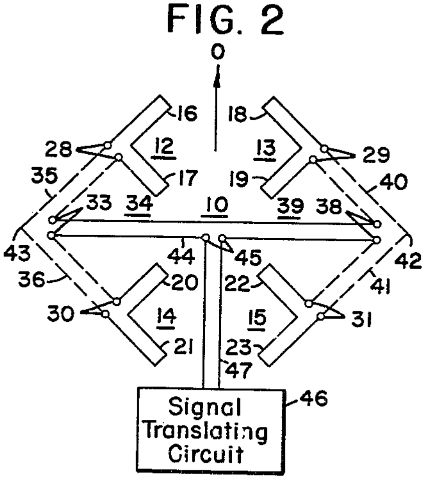
Figure 2 is a schematic view of the antenna of Figure 1 in which the active antenna elements at frequencies in the highest range are shown in full outline with the remainder of the antenna structure indicated in dotted outline.

The operation of antenna 10 may first be considered at the geometric mean frequency of the highest one of the frequency ranges by reference to Figure 2 in which the elements of the antenna which function in the highest range of frequencies are shown in solid line representation while the remainder of the structure is shown in dotted outline. Signals from translator 46 are supplied through feeder line 47 to both halves of transmission line 44. The left half of transmission line 44 supplies signals to dipoles 12 and 14 through transmission line 35, 36 via terminals 33. The right half of transmission line 44 supplies signals to dipoles 13 and 15 through transmission line 40, 41 via terminals 38. At this frequency, the length of each leg of dipoles 12, 13, 14 and 15, which in the illustrative example is about four inches, is equal to approximately one-quarter wavelength, so that the length of each dipole corresponds to approximately one-half wavelength. Dipoles 12, 13, 14 and 15 act as an array of four bent folded dipoles each of which offers a surge impedance to its connecting transmission line of 300 ohms and each pair of which offers a surge impedance to transmission line 44 of 600 ohms at terminals 33 and 38 respectively. At this frequency, each half of transmission line 44, which in the illustrative example is a twelve-inch length of 300-ohm parallel-conductor transmission line, acts as an impedance transformer with an effective electrical length of three-quarters wavelength. The 600-ohms impedance offered to transmission line 44 at terminal portions 38 appears as 150 ohms at terminal portions 45 and, in like manner, the 600 ohms offered to transmission line 44 at terminal portions 33 appears as 150 ohms at terminal portions 45. Thus the antenna impedance loading into terminals 45 is 300 ohms in the highest range of frequencies; this matches the 300 ohm impedance of feeder 47.

Figure 5:
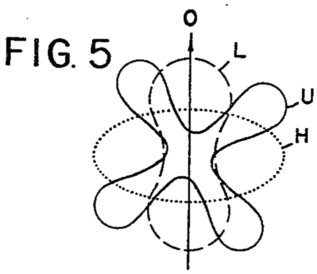
Figure 5 is a polar diagram of the field pattern of the antenna structure of Figure 1.

When four antennas, such as L-shaped dipoles 12, 13, 14 and 15, are excited in like phase and placed in a rectangular pattern, each being spaced from each adjacent dipole by a distance of approximately three-quarters wavelength at the geometric mean frequency of the highest of the three ranges, the field pattern appears as four lobes disposed symmetrically with respect to each other as illustrated by curve U of Figure 5. This curve is a polar diagram of the field pattern in the plane of the antenna with the zero axis corresponding to the orientation arrow O in Figure 2; however, the pattern rotates slightly with frequency changes within the highest range of frequencies.

Figure 3:
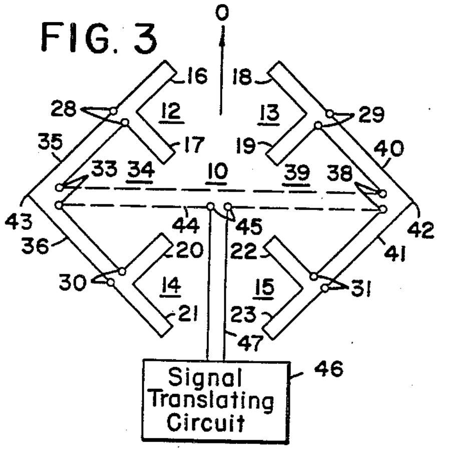
Figure 3 is a schematic view of the antenna of Figure 1 in which the active antenna elements at frequencies in the intermediate range are shown in full outline with the remainder of the antenna structure indicated in dotted outline.

When the antenna is operated at the geometric mean frequency of the intermediate one of the three aforementioned ranges, as illustrated by Figure 3 in which the elements of the antennas which function in the intermediate range are shown in solid line representation while the remainder of the antenna structure is shown in dotted outline, transmission line 40, 41 is combined with dipoles 13 and 15 to form dipole 39, while line 35, 36 is combined with dipoles 12 and 14 to form dipole 34. As illustrated in Figure 3, dipoles 34 and 39 are L-shaped and include two legs of equal length 40, 41 and 35, 36 which describe an angle of 90° with each other and equal angles with a line connecting the apices 42, 43 of the dipole. At this frequency antenna 10 acts as an array of two bent folded dipoles spaced by approximately one-half wavelength at the geometric mean frequency of the intermediate frequency range. In the illustrative example each leg of dipoles 34 and 39 comprises twelve inches of 300-ohm parallel-conductor transmission line which does not have an electrical length of one-quarter wavelength at the geometric mean frequency of the intermediate range of frequencies, however, the additional length added by perpendicularly disposed legs 17, 19, 20 and 22 which are illustrated as a four-inch stub of 300-ohm transmission line, and the capacitive end loading effect of these additional legs results in an effective electrical length of one-half wave for each dipole at this frequency. As further illustrated in Figure 3, transmission line 44, shown in dotted outline, does not function as an antenna element but rather feeds signals from signal translator 46 to each dipole 34 and 39 via terminals 33 and 38.

When two antennas, such as L-shaped dipoles 34 and 39, are excited in like phase and physically spaced from one another by substantially one-half wavelength, the field pattern approaches the elliptical configuration of curve H in Figure 5. This curve is a polar diagram of the field pattern in the plane of the antenna with the zero axis corresponding to the orientation arrow O in Figure 3.

Figure 4:
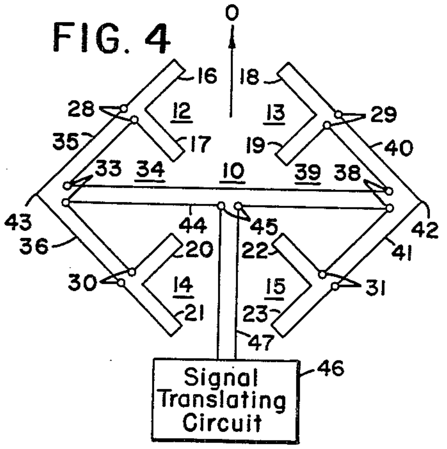
Figure 4 is a schematic view of the antenna of Figure 1 in which the active antenna elements at frequencies in the lowest range are shown in full outline.

In the lowest of the three aforementioned frequency ranges, the entire antenna, as illustrated in Figure 4, acts as a single half-wave folded dipole. Parallel-conductor line 44 receives signals from signal translator 46 through parallel-conductor line 47. In the illustrative example parallel-conductor line 44 is portrayed as a twenty-four inch length of 300-ohm parallel-conductor transmission line which does not have an electrical length of one-half wavelength at the geometric mean frequency of the lowest of the frequency ranges, however, due to the additional length added by dipoles 34 and 39 and the capacitive end loading effect resulting from their positioning at the extreme ends of line 44, the effective electrical length of transmission line 44 is one-half wavelength at this frequency.

The field pattern for a folded dipole is that of a "figure 8" with the maxima disposed at right angles at the line of the antenna. The end loading effect of dipoles 34 and 39, however, tends to distort this pattern and the resulting pattern approaches that illustrated by curve L of Figure 5.

It has been found, in operating the antenna over any one of the three frequency ranges, that no adjustment is required since the desired impedance of 300 ohms is maintained at the highest and lowest ranges of frequencies while only a small power loss results from the fact that the impedance looking into terminal portions 45 is 600 ohms at the intermediate frequency range. Further, since folded dipoles are utilized, the characteristic advantage of such an antenna, namely its high efficiency over a wide range of operating frequencies, is utilized to its fullest extent.

As pointed out hereinbefore the antenna operates over each of the three frequency ranges in such a manner that the operating elements are not detrimentally affected by any portion or portions of the elements utilized for either of the other two operating ranges since the inoperative portions act as feeders for the elements being utilized.

Thus, the invention provides a broad-band tri-range antenna which is efficiently operable over three ranges in the frequency spectrum and is particularly suited to receiving signals in the three frequency bands currently assigned to television broadcast service. Furthermore, the antenna requires no adjustable tuning elements for efficient operation in each of the ranges. Additionally, the antenna is much more compact than outdoor antennas operating over three frequency ranges and can be satisfactorily enclosed, as hereinbefore described, within the confines of a television receiver cabinet.

While a particular embodiment of the invention has been shown and described, modifications may be made and it is intended in the appended claims to cover all such modifications as may fall within the true spirit and scope of the invention.

I claim:

1. A broad-band antenna operable over three frequency ranges spaced from one another in the frequency spectrum comprising: four folded dipoles, individually spaced from each adjacent dipole by a distance of approximately three-quarters wavelength at the geometric mean frequency of the highest one of said frequency ranges and individually having an effective electrical length of substantially one-half of said wavelength, and each such dipole having terminal portions; a first parallel-conductor transmission line interconnecting said terminal portions of two of said four dipoles to form in combination therewith a fifth folded dipole having an effective electrical length of substantially one-half wave length at the geometric mean frequency of the intermediate one of said frequency ranges and having terminal portions; a second parallel-conductor transmission line interconnecting said terminal portions of the remaining two of said first-mentioned folded dipoles to form in combination therewith a sixth folded dipole having an effective electrical length of substantially one-half wavelength at the geometric mean frequency of the intermediate one of said frequency ranges and having terminal portions spaced from the terminal portions of said fifth dipole by a distance of approximately one-half wavelength at the geometric mean frequency of the intermediate one of said frequency ranges; and an additional parallel-conductor transmission line having feeder terminals in one of its conductors and interconnecting said terminal portions of said fifth and sixth dipoles to form an antenna element having an effective electrical length approximately equal to one-half wavelength at the geometric mean frequency of the lowest of said frequency ranges.

2. A broad-band antenna operable over three frequency ranges spaced from one another in the frequency spectrum comprising: four folded dipoles individually spaced from each adjacent dipole by a distance of approximately three-quarters wavelength at the geometric mean frequency of the highest one of said frequency ranges, individually including angularly disposed legs which together have an effective electrical length of substantially one-half of said wavelength, and individually having terminal portions; a first parallel-conductor transmission line interconnecting said terminal portions of two of said four dipoles to form in combination therewith a fifth folded dipole including angularly disposed legs which together have an effective electrical length of substantially one-half wavelength at the geometric mean frequency of the intermediate one of said frequency ranges and having terminal portions; a second parallel-conductor transmission line interconnecting said terminal portions of the remaining two of said first-mentioned folded dipoles to form in combination therewith a sixth folded dipole including angularly disposed legs which together have an effective electrical length of substantially one-half wavelength at the geometric mean frequency of the intermediate one of said frequency ranges, and having terminal portions spaced from the terminal portions of said fifth dipole by a distance of approximately one-half wavelength at the geometric mean frequency of the intermediate one of said frequency ranges; and an additional parallel-conductor transmission line, having feeder terminals in one of its conductors, interconnecting said terminal portions of said fifth and sixth dipoles to form an antenna element having an effective electrical length approximately equal to one-half wavelength at the geometric mean frequency of the lowest of said frequency ranges.

3. A broad-band antenna operable over three frequency ranges spaced from one another in the frequency spectrum comprising: four folded dipoles individually spaced from each adjacent dipole by a distance of approximately three-quarters wavelength at the geometric mean frequency of the highest one of said frequency ranges, individually including a pair of legs disposed at 90° relative to one another and together having an effective electrical length of substantially one-half of said wavelength, and each such dipole having terminal portions; a first parallel-conductor transmission line interconnecting said terminal portions of two of said four dipoles to form in combination therewith a fifth folded dipole including a pair of legs disposed at 90° relative to one another and together having an effective electrical length of substantially one-half wavelength at the geometric mean frequency of the intermediate one of said frequency ranges, and having terminal portions; a second parallel-conductor transmission line interconnecting said terminal portions of the remaining two of said first-mentioned dipoles to form in combination therewith a sixth folded dipole including a pair of legs disposed at 90° relative to one another and together having an effective electrical length of substantially one-half wavelength at the geometric mean frequency of the intermediate one of said frequency ranges, and having terminal portions spaced from the terminal portions of said fifth dipole by a distance of approximately one-half wavelength at the geometric mean frequency of the intermediate one of said frequency ranges; and an additional parallel-conductor transmission line, having feeder terminals in one of its conductors, interconnecting said terminal portions of said fifth and sixth dipoles to form an antenna element having an effective electrical length approximately equal to one-half wavelength at the geometric mean frequency of the lowest of said frequency ranges.

4. A broad-band antenna operable over three frequency ranges spaced from one another in the frequency spectrum comprising: four L-shaped folded dipoles individually spaced from each adjacent dipole by a distance of approximately three-quarters wavelength at the geometric mean frequency of the highest one of said frequency ranges, individually including legs of equal length which together have an effective electrical length of substantially one-half of said wavelength, and individually having terminal portions; a first parallel-conductor transmission line interconnecting said terminal portions of two of said four dipoles to form in combination therewith a fifth generally L-shaped folded dipole including legs of equal length which together have an effective electrical length of substantially one-half wavelength at the geometric mean frequency of the intermediate one of said frequency ranges, and having terminal portions; a second parallel-conductor transmission line interconnecting said terminal portions of the remaining two of said first-mentioned folded dipoles to form in combination therewith a sixth generally L-shaped folded dipole including legs of equal length which together have an effective electrical length of substantially one-half wavelength at the geometric mean frequency of the intermediate one of said frequency ranges and having terminal portions spaced from the terminal portions of said fifth dipole by a distance of approximately one-half wavelength at the geometric mean frequency of the intermediate one of said frequency ranges; and an additional parallel-conductor transmission line, having feeder terminals in one of its conductors, interconnecting said terminal portions of said fifth and sixth dipoles to form an antenna element having an effective electrical length approximately equal to one-half wavelength at the geometric mean frequency of the lowest of said frequency ranges.

5. A broad-band antenna operable over three frequency ranges spaced from one another in the frequency spectrum comprising: four L-shaped folded dipoles disposed in a common plane and individually spaced from each adjacent dipole by a distance of approximately three-quarters wavelength at the geometric mean frequency of the highest one of said frequency ranges, individually including legs of equal length which together have an effective electrical length of substantially one-half of said wavelength, and individually having terminal portions; a first parallel-conductor transmission line interconnecting said terminal portions of two of said four dipoles to form in combination therewith a fifth generally L-shaped folded dipole including legs of equal length which together have an effective electrical length of substantially one-half wavelength at the geometric mean frequency of the intermediate one of said frequency ranges, and having terminal portions; a second parallel-conductor transmission line interconnecting said terminal portions of the remaining two of said first-mentioned folded dipoles to form in combination therewith a sixth generally L-shaped folded dipole including legs of equal length which together have an effective electrical length of substantially one-half wavelength at the geometric mean frequency of the intermediate one of said frequency ranges, and having terminal portions spaced from the terminal portions of said fifth dipole by a distance of approximately one-half wavelength at the geometric mean frequency of the intermediate one of said frequency ranges; and an additional parallel-conductor transmission line, having feeder terminals in one of its conductors, interconnecting said terminal portions of said fifth and sixth dipoles to form an antenna element having an effective electrical length approximately equal to one-half wavelength at the geometric mean frequency of the lowest of said frequency ranges.

6. A broad-band antenna enclosed within the cabinet structure of a wave-signal receiver operable over three frequency ranges spaced from one another in the frequency spectrum comprising: four folded dipoles disposed substantially in the plane of the top of said cabinet and individually spaced from each adjacent dipole by a distance of approximately three-quarters wavelength at the geometric mean frequency of the highest one of said frequency ranges, individually having an effective electrical length of substantially one-half of said wavelength, and individually having terminal portions; a first parallel-conductor transmission line interconnecting said terminal portions of two of said four dipoles to form in combination therewith a fifth folded dipole disposed in said plane and having an effective electrical length of substantially one-half wavelength at the geometric mean frequency of the intermediate one of said frequency ranges, and having terminal portions; a second parallel-conductor transmission line interconnecting said terminal portions of the remaining two of said first-mentioned folded dipoles to form in combination therewith a sixth folded dipole disposed in said plane and having an effective electrical length of substantially one-half wavelength at the geometric mean frequency of the intermediate one of said frequency ranges; and an additional parallel-conductor transmission line, having feeder terminals in one of its conductors, interconnecting said terminal portions of said fifth and sixth dipoles to form an antenna element having an effective electrical length approximately equal to one-half wavelength at the geometric mean frequency of the lowest of said frequency ranges.

No references cited.